United States Patent [19]
Berger et al.

[11] 3,902,578
[45] Sept. 2, 1975

[54] SEGMENTED FRICTION DISK FOR BRAKE OR CLUTCH

[75] Inventors: Robert E. Berger, North Canton; Edward A. Aukscunas, Akron, both of Ohio

[73] Assignee: Goodyear Aerospace Corporation, Akron, Ohio

[22] Filed: Oct. 5, 1973

[21] Appl. No.: 403,773

[52] U.S. Cl................... 188/218 XL; 192/107 R
[51] Int. Cl.².................................. F16D 65/12
[58] Field of Search........ 188/218 XL, 73.1, 251 A; 192/107 R, 107 M

[56] References Cited
UNITED STATES PATENTS

| | | | |
|---|---|---|---|
| 2,531,696 | 11/1950 | Martin | 188/218 XL |
| 3,426,871 | 2/1969 | Harnish | 188/218 XL |
| 3,473,635 | 10/1969 | Krause | 188/218 XL |
| 3,483,953 | 12/1969 | Bender | 188/218 XL |
| 3,525,421 | 8/1970 | Sickle et al. | 188/218 XL |
| 3,698,519 | 10/1972 | Crossman | 192/107 R |
| 3,757,907 | 9/1973 | Crossman et al. | 188/218 XL |
| 3,759,353 | 9/1973 | Marin | 188/251 A |

FOREIGN PATENTS OR APPLICATIONS

| | | | |
|---|---|---|---|
| 227,857 | 2/1969 | U.S.S.R. | 188/218 XL |
| 966,573 | 8/1964 | United Kingdom | 188/218 XL |

Primary Examiner—Trygve M. Blix
Assistant Examiner—Edward R. Kazenske
Attorney, Agent, or Firm—F. W. Brunner; P. E. Milliken; E. W. Oldham

[57] ABSTRACT

A friction disk for utilization as either a brake or clutch has a plurality of arcual segments containing a recess in the end portions thereof. A clip joins adjacent arcual segments to form an annulus disk brake or clutch. A plug, which can be made out of the same type of material as the disk, is located within the recesses and helps maintain alignment of the segments. This is accomplished through a portion of the plug having a rib which matingly engages a groove located in the recesses of the segments with the ribs and grooves contacting each other such that no gap exists therebetween.

3 Claims, 4 Drawing Figures

PATENTED SEP 2 1975  3,902,578

SEGMENTED FRICTION DISK FOR BRAKE OR CLUTCH

BACKGROUND OF THE INVENTION

The present invention relates to a segmented friction disk. More specifically, the present invention relates to a segmented friction disk wherein the spacial relationship of the various segments with respect to one another is maintained under load by a plug.

Heretofore, friction brake disks for heavy duty application such as in jet airliners have commonly been made in one unit. Such a construction is very expensive and is subject to failure under high thermo stresses.

In order to avoid the shortcomings of the solid brake disk, segmented brake disks have been utilized wherein the ends of the segments have been joined together by metal members. Due to the development of intense heat and high temperatures under loads, the segments must be joined such that a gap exists between their ends. However, such segmented brakes during the application of a load would skew with respect to one another and the ends would cock with respect to one another. That is respectively, the segments would move out of the plane of the disk and the inner radial surface or end portion of each segment would move with respect to one another. Such skewing and cocking would cause uneven and excessive wear of the brake segments and eventually cause mechanical failure of the brake disk. Moreover, such loading would also cause the rivets which, connect the metal members to the segments, to wear and enlarge the disk rivet aperture there by permitting the segments to skew and cock with respect to one another to an even greater extent.

SUMMARY OF THE INVENTION

It is, therefore, an object of the present invention to provide a segmented friction disk which is economical to fabricate and which reduces thermal stresses.

It is another object of the present invention to produce a segmented friction disk, as above, which is rigid and stable under loads and wears evenly.

It is a further object of the present invention to provide a segmented friction disk, as above, through which alignment under loads is facilitated by a plug.

Generally, a friction disk according to the present invention contains a plurality of arcual segments which have a recess in the side portion thereof. A clip joins the adjacent segments to form a disk and a plug is located in the recesses to help maintain the alignment of the segments.

In general, a preferred embodiment and an alternative embodiment of the present invention is described in detail without attempting to discuss all of the various modifications in which the invention might be embodied; the invention being measured by the appended claims and not by the details of the specification.

DESCRIPTIONS OF THE DRAWINGS

DESCRIPTION OF THE PREFERRED EMBODIMENTS

Figure 1:
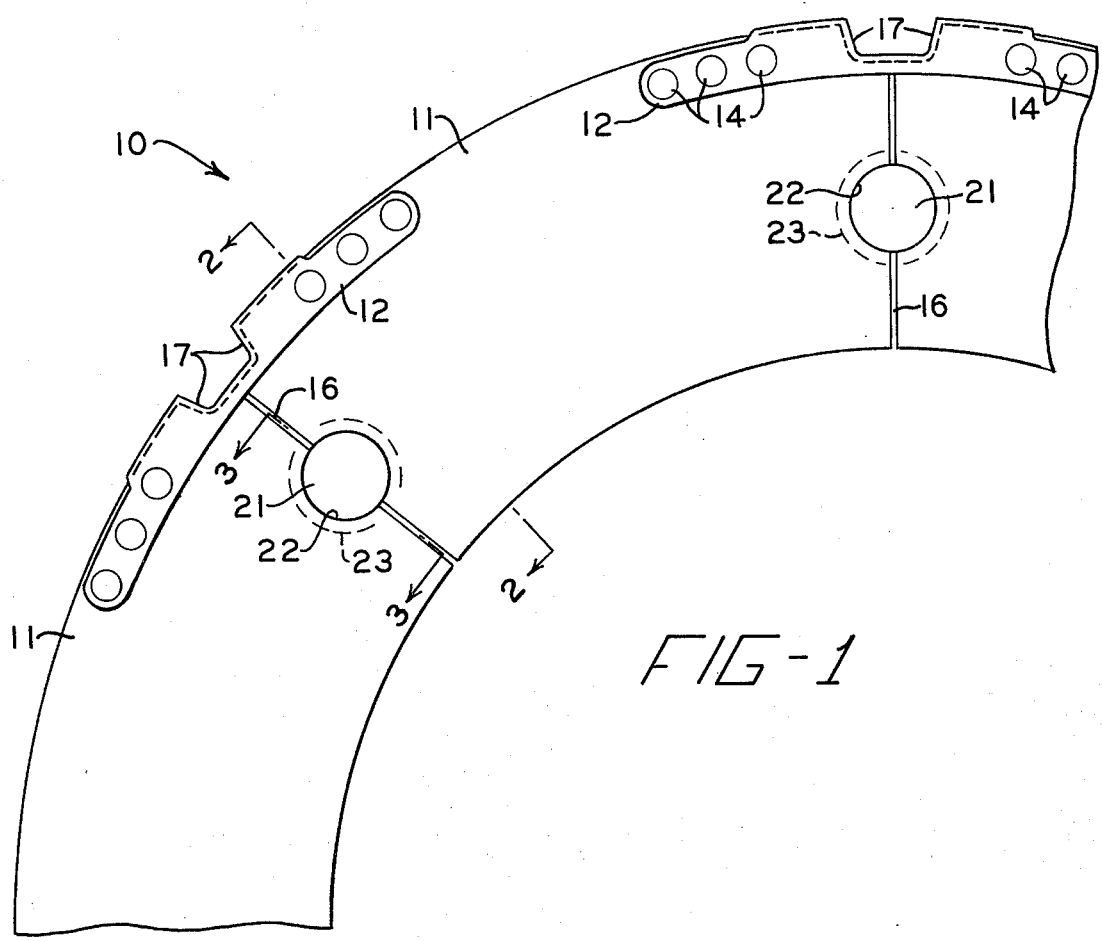
FIG. 1 is a plan view showing a portion of the segments.

A segmented friction disk according to the concepts of the present invention which can be used either as a clutch and preferably as a brake disk is generally indicated by the numeral 10. As shown in FIG. 1, the segmented friction disk described herein as a brake disk, is made up of a plurality of arcual brake portions or segments 11 which when joined together, form the annulus type configuration of a conventional brake disk. Preferably, for ease of manufacture and convenience of assembly, segments 11 are of equal length and of such an extent so that when assembled, they form a brake disk of 360°.

Figure 2:
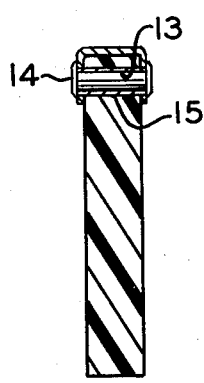
FIG. 2 is an end elevation view taken on line 2—2 of FIG. 1 showing the clip connection.

Clips 12, preferably made of steel or a high temperature alloy, join or connect the segments together. As seen in FIG. 2, a portion of the clips are inverted U-shaped and as seen in FIG. 1, the end portions of the clips contain apertures 13. Rivets 14 or other conventional fastening members extend through the apertures as well as through holes 15 located in the periphery portion of the segments to secure the clips to the disk segment. A gap or opening 16 exists between the segments to facilitate assembly and primarily to allow for expansion caused by high temperatures during the use of loading of the disk. In the embodiments shown, the clips have keyway slots or recesses 17 to permit the disk to be conventionally engaged by splines of a brake wheel assembly or a clutch assembly. Although not shown, as well known to one skilled in the art, brake or clutch segments 11 engage other so called "stationary" disks. In a braking assembly, such stationary disks are mounted on stators which usually engage, through inner periphery recesses splines of a torque tube whereas in a clutch assembly such disks are usually connected to a drive train. Furthermore, the steel clips are desirable since they can withstand the pressures exerted by such wheel or housing assembly during the braking operation whereas the brake disk, which is preferably made of a plurality of resin impregnated carbon cloth layers, may be subjected to an excess of stress and fail or break. Of course, the brake disk material is not limited to laminated carbon cloth made in a manner well known to one skilled in the art, but may be made of steel or other materials.

Figure 3:
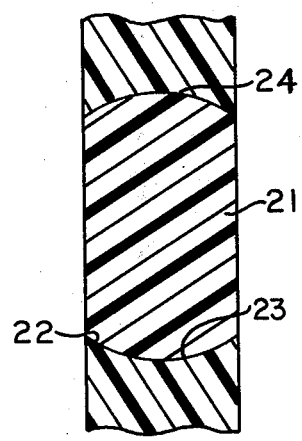
FIG. 3 is a cross sectional view taken on line 3—3 of FIG. 1 showing a plug.

Plugs 21, preferably made of the same type of material as the brake disk, are positioned between the ends of the segments and resist shear loads. As shown in FIGS. 1 and 3, a recess 22 is provided in each end portion of segment 11 and may generally be of any shape or configuration such as curvilinear which permits facile installation of the plug. Recess 22 which is semi-circular in the embodiment shown in FIG. 1, preferably has a groove or slot 23 extending inwardly into the segment along the circumference of the recess. Such a provision which may be arcual permits the plug which generally has a correspondingly shaped rib 24 to maintain alignment between the segment end portions thereby preventing skewing when the plug is of the same shape and size as the recess. Moreover, the plug when inserted in the recesses and the clips attached to the peripheral portions of the segments and thereby prevent cocking.

Figure 4:
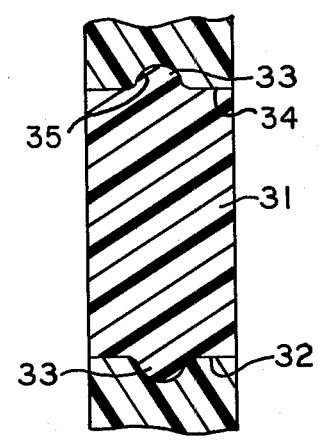
FIG. 4 is a cross sectional view showing an alternative embodiment of a plug.

The embodiment of FIG. 4 represents an alternate configuration of a plug which may be installed in a matching contour of the recess. As shown, plug 31 has essentially a cylindrical outer surface 32 with the exception of nub or rib 33 which extends radially outward thereof about the circumference. As before, the provision of a rib is highly desirable since it helps maintain proper alignment of the segmented disk portions when the brake disk is under a load.

As shown in the preferred embodiments of the invention clearly depicted by FIGS. 3 and 4, recesses 22 and 34 have a concave or arcual groove portion 23 and 35 with respect to the width, that is the axial width, of the segments with the intermost portion of the arcual groove being located in the center portion of the recess or the axial width of the segments. Additionally, recesses 22 and 34 extend across the entire width of the segments. As clearly shown, plug 21 and 31 contact arcual grooves 23 and 35 so that no space or small gap exists between the plug 21, 31 and segments 11. Ribs 24 or 33 are arcually shaped with respect to the width of the plug and they extend across the entire width of the plug as shown in FIG. 3, or across a portion of the plug as shown in FIG. 4 Preferably as shown in FIGS. 3 and 4, arcual ribs 24 and 33 have a projection, the outermost portion of which is located in the central portion of the plug width and of course matingly engages the intermost portion of grooves 23 and 35 which are also located in the central portion of the recessed width.

As apparent to one skilled in the art, modifications to the friction disk assembly can be made without departing from the spirit of the invention herein disclosed and claimed, the scope of the invention being measured solely by the scope of the attached claims.

What is claimed is:
1. A segmented friction disk comprising,
   a plurality of arcual segments having end portions and a periphery,
   a gap existing between said segments,
   said segments having a recess in said end portions and an axial width,
   a plug located in said recesses between adjacent segments,
   a clip connecting adjacent end portions of said periphery of said arcual segments
   said recess having a groove and said plug having a correspondingly shaped rib,
   said plug contacting said groove along said axial width of said segments and
   said plug extending across the entire width of said segments,
   said groove having an arcual portion with respect to the axial width of said segments and said rib having an arcual portion with respect to the axial width of said plugs, and said arcual ribs having a shape corresponding to said arcual groove.
2. A segmented friction disk as in claim 1, wherein said arcual groove portion extends across the entire width of said segment and said arcual rib portion extends across the entire width of said plug.
3. A segmented friction disk as in claim 1, wherein said arcual groove portion is located in the central portion of the segment width and said arcual rib portion is located in the central portion of said plug width.

* * * * *